(12) United States Patent
Brian (10) Patent No.: US 10,506,019 B2
(45) Date of Patent: Dec. 10, 2019

(54) METHODS OF SERVICING ONE OR MORE CONSUMER APPLIANCES

(71) Applicant: Haier US Appliance Solutions, Inc., Wilmington, DE (US)

(72) Inventor: Joseph Mark Brian, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 10 days.

(21) Appl. No.: 15/879,602

(22) Filed: Jan. 25, 2018

(65) Prior Publication Data

US 2019/0230147 A1 Jul. 25, 2019

(51) Int. Cl.
*G08B 1/00* (2006.01)
*H04L 29/08* (2006.01)
*H04L 12/28* (2006.01)

(52) U.S. Cl.
CPC ........ *H04L 67/025* (2013.01); *H04L 12/2814* (2013.01); *H04L 67/125* (2013.01); *H04L 2012/285* (2013.01)

(58) Field of Classification Search
None
See application file for complete search history.

(56) References Cited

U.S. PATENT DOCUMENTS

| | | | |
|---|---|---|---|
| 6,380,866 B1 * | 4/2002 | Sizer, II | H04L 12/2803 340/12.5 |
| 6,502,411 B2 * | 1/2003 | Okamoto | F25B 49/00 236/51 |
| 6,791,467 B1 * | 9/2004 | Ben-Ze'ev | G08C 19/28 340/12.25 |
| 7,110,836 B2 * | 9/2006 | Sturm | G08C 17/00 340/3.31 |
| 7,739,078 B2 * | 6/2010 | Ferchau | G05B 23/0216 701/31.4 |
| 8,040,234 B2 * | 10/2011 | Ebrom | D06F 39/005 340/531 |
| 8,155,120 B2 | 4/2012 | McCoy et al. | |
| 8,402,376 B2 | 3/2013 | Argue et al. | |
| 8,680,983 B2 | 3/2014 | Ebrom et al. | |
| 9,225,766 B2 | 12/2015 | Philip et al. | |
| 2005/0091346 A1 | 4/2005 | Krishnaswami et al. | |
| 2005/0162273 A1 * | 7/2005 | Yoon | G05B 19/0421 340/539.14 |
| 2007/0160022 A1 | 7/2007 | McCoy et al. | |
| 2012/0173857 A1 | 7/2012 | Kobraei et al. | |

* cited by examiner

*Primary Examiner* — K. Wong
(74) *Attorney, Agent, or Firm* — Dority & Manning, P.A.

(57) ABSTRACT

Methods of servicing one or more consumer appliances are provided herein. The method may include establishing an automatic wireless connection to the consumer appliance with a removably attached dongle through a cellular communications network. The method may also include identifying a consumer appliance as one appliance type of a predetermined plurality of appliance types. The method may further include receiving a recorded log data set from the consumer appliance through the dongle based on the identified appliance type. The method may still further include determining whether an errant event has occurred at the consumer appliance based on the recorded log data set.

18 Claims, 3 Drawing Sheets

FIG. 2

METHODS OF SERVICING ONE OR MORE CONSUMER APPLIANCES

FIELD OF THE INVENTION

The present subject matter relates generally to consumer appliances and, more particularly, to features and methods for servicing or diagnosing consumer appliances.

BACKGROUND OF THE INVENTION

Consumer appliances, such as refrigerator appliances, oven appliances, microwave appliances, dishwasher appliances, etc., generally include one or more components for directing operation of a given consumer appliance. For example, a consumer appliance may include a controller having a printed circuit board and memory that is connected to a control pad. Through programmed instructions and input from the control pad, the controller may work with the other components of the appliance to direct operations thereof.

In order to service a consumer appliance, a service professional must generally be dispatched to a consumer or user's physical address (i.e., where the consumer appliance is installed). The consumer must schedule a time for the service professional to arrive that fits within the schedule of both the service professional and the consumer. It is only once a service professional arrives that a diagnosis of the consumer appliance can be performed. For instance, the service professional must generally be physically proximate to the consumer appliance in order to a) properly identify the type or model of the consumer appliance, and b) diagnose any errant event or problem that may have occurred. Once the diagnosis is complete, though, the service professional may need to return at a later date (e.g., once a necessary part or tool has arrived). In many cases, this process can be especially frustrating to users. The frustration may be magnified if a separate appliance at the same address requires service soon after the first appliance.

Therefore, further improvements to methods and tools for servicing consumer appliances are necessary. In particular, it would be advantageous to provide methods and tools that permit identification of one or more consumer appliances, as well as issues associated therewith, prior to or after the arrival of a service professional. It may be further advantageous to provide methods and tools that permit the simultaneous servicing of multiple discrete consumer appliances prior to or after the arrival of a service professional.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of servicing a consumer appliance is provided. The method may include establishing an automatic wireless connection to the consumer appliance with a removably attached dongle through a cellular communications network. The method may also include identifying the consumer appliance as one appliance type of a predetermined plurality of appliance types. The method may further include receiving a recorded log data set from the consumer appliance through the dongle based on the identified appliance type. The method may still further include determining whether an errant event has occurred at the consumer appliance based on the recorded log data set.

In another exemplary aspect of the present disclosure, a method of servicing a plurality of consumer appliances is provided. The method may include attaching a separate dongle of a plurality of dongles to each consumer appliance of the plurality of consumer appliances. The method may also include establishing an automatic wireless connection with each separate dongle of the plurality of dongles through a cellular communications network. The method may still further include separately identifying each consumer appliance as one appliance type of a predetermined plurality of appliance types. The method may yet still further include receiving a recorded log data set from each consumer appliance through the attached dongle based on the separately identified appliance type.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 1:
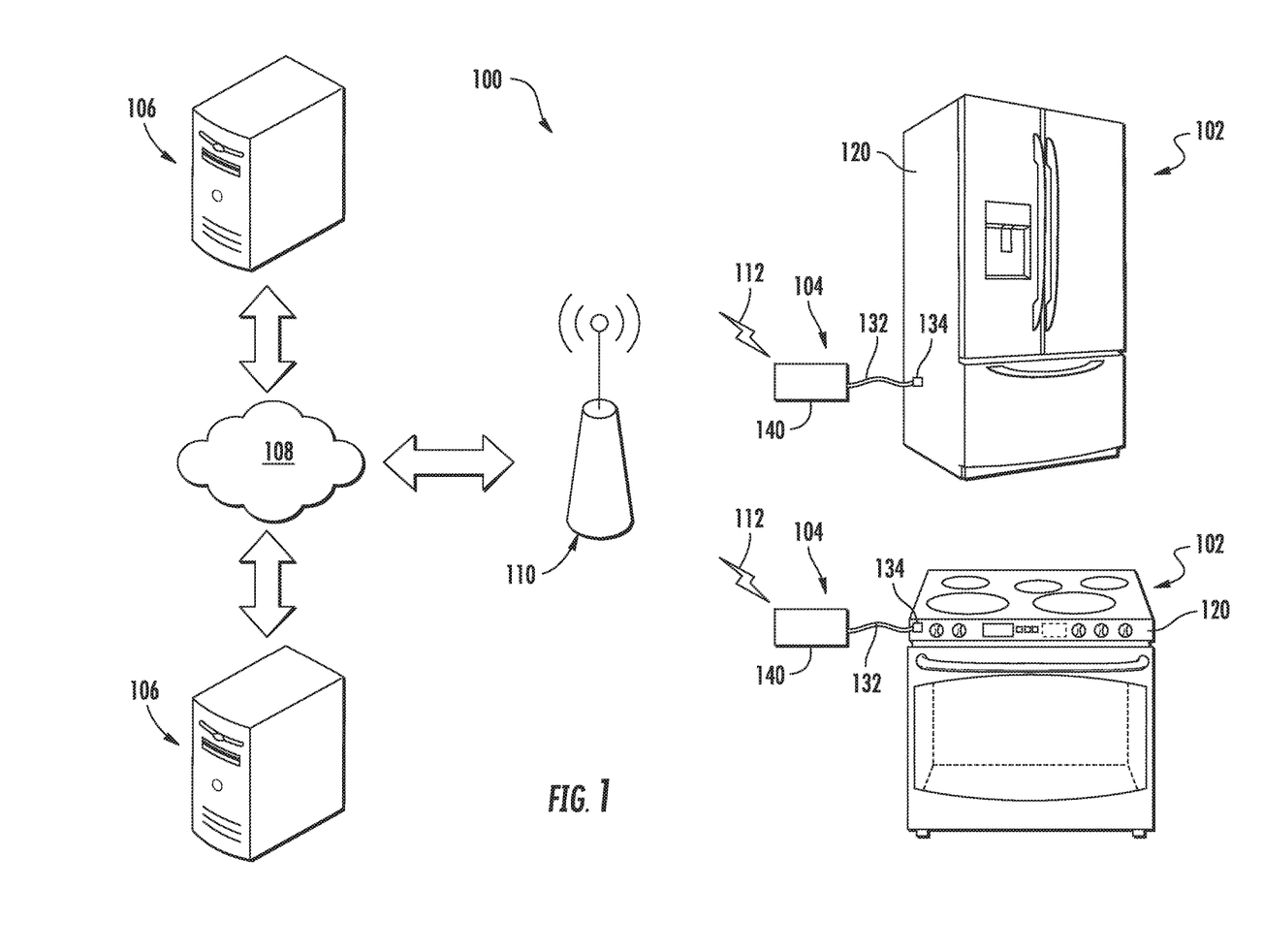
FIG. 1 provides a schematic view of a servicing system according to exemplary embodiments of the present disclosure.
Figure 2:
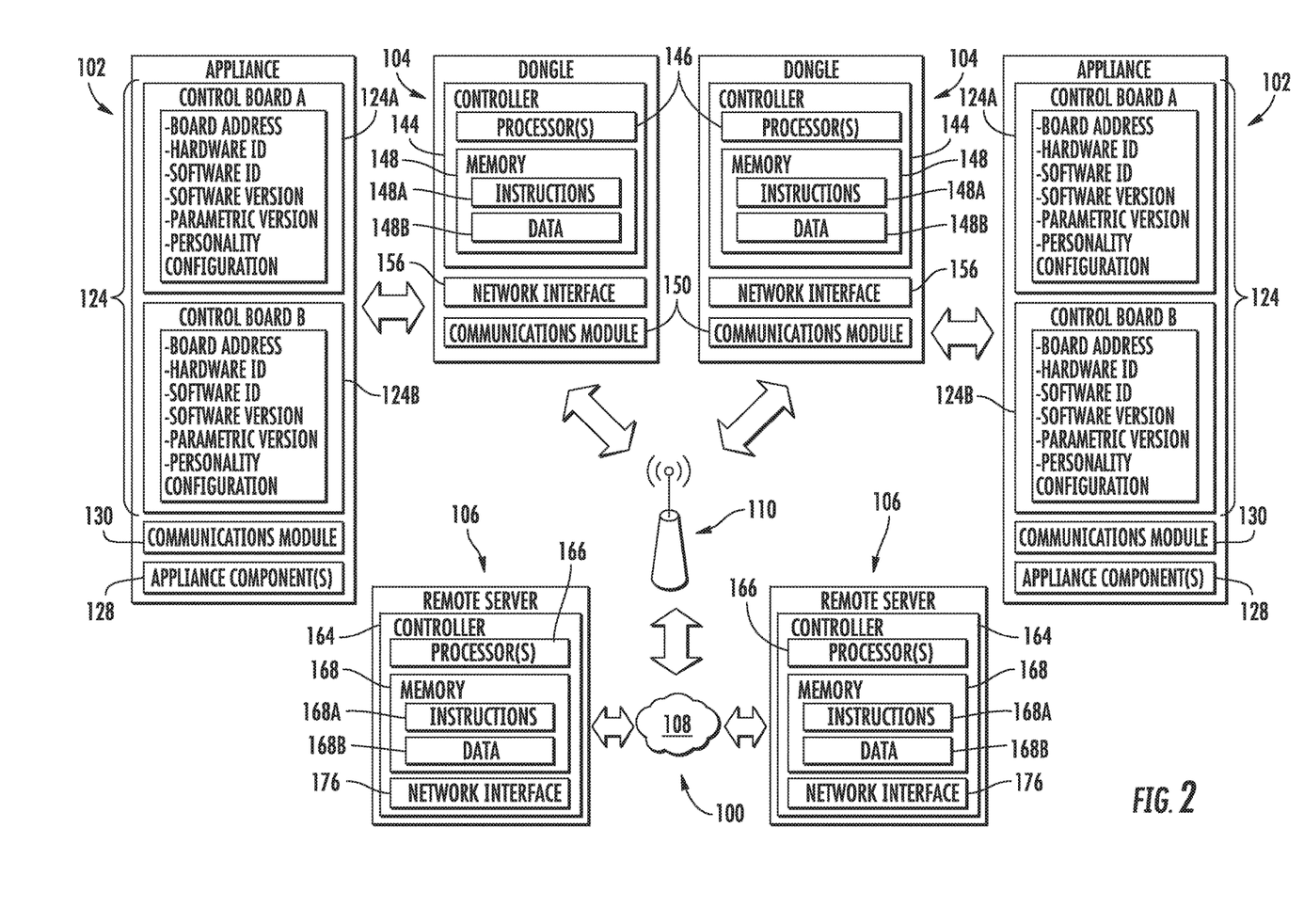
FIG. 2 provides a further schematic view of a servicing system according to exemplary embodiments of the present disclosure.

Turning now to the figures, FIGS. 1 and 2 provide different schematic views of a servicing system 100 according to exemplary embodiments of the present disclosure. Generally, it is understood that such systems may be utilized to service (e.g., test, update, diagnose, debug, etc.) one or more consumer appliances 102. In particular, one or more removably-attached dongles 104 and remote servers 106 may be permitted to communicate with the consumer appliances 102 in order to aid or facilitate one or more service operations, as will be described in detail below. As shown, each dongle 104 can be communicatively coupled with a secondary network 108 and various nodes coupled with the secondary network 108, such as one or more remote servers 106. Additionally or alternatively, although secondary network 108 is shown, one or more separate dongles 104 can be communicatively coupled via a suitable wired or wireless means, such as, for example, via physical wires, transceiving, transmitting, or receiving components.

It is noted that although consumer appliances 102 are shown as a refrigerator appliance and an oven appliance, additional or alternative embodiments may provide one or more different consumer appliances (e.g., different types of appliances), such as a water heater appliance, microwave appliance, dishwashing appliance, washing machine appliance, dryer appliance, or any other suitable consumer appliance. Moreover, although two separate consumer appliances 102 are shown, additional or alternative embodiments may provide fewer appliances (i.e., a single consumer appliance) or more appliances (i.e., three or more consumer appliances). Each consumer appliance 102 may be of the same type or of a different type.

As would be understood, each consumer appliance 102 generally includes a cabinet 120 and one or more appliance components 128 (e.g., compressor, heating element, motor, air blower, etc.) attached thereto for performing the predetermined functions of the corresponding consumer appliance 102 (e.g., cooling, heating, etc.). Such appliance components 128 are assembled in communication with a corresponding appliance controller 124 that is, for example, mounted on or within cabinet 120 of consumer appliance 102). Along with appliance components 128, the appliance controller 124 may be in communication with one or more sensors (e.g., temperature sensors, pressure sensors, accelerometers, gyroscopes, etc.) attached to or within cabinet 120 for detecting certain corresponding conditions (e.g., temperature, pressure, acceleration, rotation, etc.) of the consumer appliance 102 and permitting the appliance controller 124 to record one or more log sets of such conditions. Thus, appliance controller 124 may assemble and store log data sets of information regarding the conditions of operation for the consumer appliance over one or more periods of time.

Figure 3:
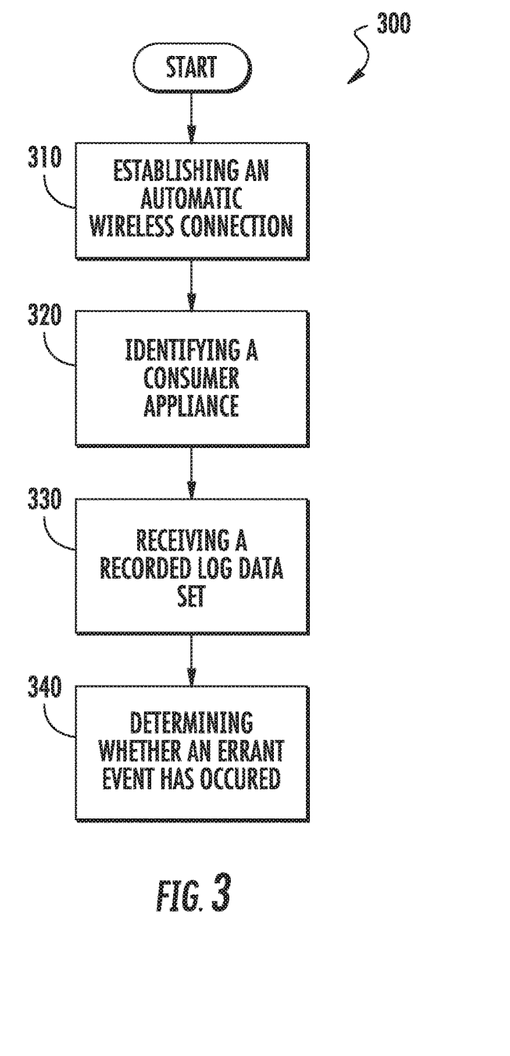
FIG. 3 provides a flow chart illustrating a method of servicing a consumer appliance according to exemplary embodiments of the present disclosure.

As illustrated in FIG. 3, each appliance controller 124 generally includes one or more control boards [e.g., a first control board 124A (Control Board A) and a second control board 124B (Control Board B)]. Each control board 124A and 124B may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions that are executed by the processor to cause consumer appliance 102 to perform various operations. For example, instructions could be instructions for directing activation of one or more appliance components 128. Instructions could further be for receiving/transmitting log data signals (e.g., fault codes, signals corresponding to performance or of the consumer appliance 102, such as temperature, pressure, speed, rotation, or activation/deactivation history of appliance components 128), recording log data as one or more log data sets over time (e.g., within memory), etc.

In some embodiments, one or more of the control boards 124A, 124B include (e.g., within the memory) certain non-functional character data relating to the corresponding control board 124A or 124B. In particular, the non-functional character data includes information regarding attributes of the control board 124A or 124B that do not directly relate to (e.g., are not descriptive of) the purpose or functionality of the consumer appliance 102. Moreover, in contrast to a stored model number of the consumer appliance 102, the non-functional character data may pertain to the control board 124A or 124B itself, and not overall assembled consumer appliance 102.

As an example, the non-functional character data may include component identification information of the control board 124A or 124B, such as a board address number (e.g., provided in hexadecimal form), hardware identifier of the control board 124A or 124B, or image identifier relating to software preprogrammed on control board 124A or 124B (e.g., the type of software, which corresponds to the type of consumer appliance 102 to be controlled). As an additional or alternative example, the non-functional character data may include software version information (e.g., the version or iteration number of the software programmed on control board 124A or 124B). As yet another additional or alternative example, the non-functional character data may include parametric version information (e.g., the version or iteration number of parametric data stored on control board 124A or 124B to facilitate software execution). As still another additional or alternative example, the non-functional character data may include personality configuration information (e.g., one or more programmed settings specifying which portion or package of the software is to be executed).

As will be described in greater detail below, one or more elements of non-functional data (e.g., a plurality of non-functional data elements) may be collected and used to determine an appliance configuration manifest (ACM). Advantageously, the ACM may account for variations in multiple consumer appliances that do and do not influence service operations without trying to specifically identify each unique model of consumer appliance that may be connected to or serviced by dongle 104.

Appliance controller 124 includes one or more communications modules 130 such that consumer appliance 102 can selectively connect to and communicate with a removably attached dongle 104 (e.g., over one or more conductive signal lines, shared communication busses, or wireless communications bands). In certain embodiments, conductive transmission lines 132, such as wires, extend between consumer appliance 102 and dongle 104 in connection therewith. Communications module 130 can be an onboard component of appliance controller 124 or it can be a separate, off board component. In some embodiments, communications module 130 includes or is joined to an RJ45 terminal 134 on cabinet 120. When connected to the dongle 104, the RJ45 terminal 134 on cabinet 120 may thus be positioned between the corresponding appliance controller 124 and dongle 104.

As illustrated in FIG. 1, each dongle 104 includes a casing 140 spaced apart from consumer appliance 102 (e.g., when connected thereto). Generally, casing 140 may provide an enclosure (e.g., solid, non-conductive body) for holding an isolated controller (e.g., isolated controller 144). In some embodiments, casing 140 is free of any physical control inputs (e.g., buttons, knobs, etc.) and merely provides a passive body without any user interface thereon.

As indicated in FIG. 2 especially, an isolated controller 144 of each dongle 104 may include one or more processors 146 and one or more memory devices 148 (i.e., memory). The one or more processors 146 can be any suitable processing device (e.g., a processor core, a microprocessor, an ASIC, a FPGA, a microcontroller, etc.) and can be one processor or a plurality of processors that are operatively connected. The memory device 148 can include one or more non-transitory computer-readable storage mediums, such as RAM, ROM, EEPROM, EPROM, flash memory devices, magnetic disks, etc., and combinations thereof. The memory devices 148 can store data 148B and instructions 148A that are executed by the processors 146 to cause dongle 104 to perform operations. For example, instructions 148A could be instructions 148A for executing or facilitating a portion of a service operation (e.g., automatically establishing a wireless connection or link with one or more remote servers 106, directing installation of a software installation file, etc.), receiving/transmitting signals to/from consumer appliance 102, receiving/transmitting signals to/from remote server 106. The memory devices 148 may also include data 148B, such as a one or more log data files, software installation files, etc. that can be retrieved, manipulated, created or stored by processors 146.

Isolated controller 144 includes a communications module 150 such that dongle 104 can selectively connect to and communicate with a corresponding consumer appliance 102 (e.g., over one or more conductive transmission lines 132, shared communication busses, wireless, communications bands, etc.). Communications module 150 can be an onboard component of isolated controller 144 or it can be a separate, off board component.

In some embodiments, isolated controller 144 includes a network interface 156 such that dongle 104 can connect to and communicate over one or more networks (e.g., cellular communications network 110 or secondary network 108) with one or more network nodes. Network interface 156 can be an onboard component of isolated controller 144 or it can be a separate, off board component. Isolated controller 144 can also include one or more transmitting, receiving, or transceiving components for transmitting/receiving communications with other devices communicatively coupled with dongle 104. Additionally or alternatively, one or more transmitting, receiving, or transceiving components can be located off board for isolated controller 144.

As generally illustrated in FIGS. 1 and 2, network interface 156 may include or be embodied as a cellular radio unit (e.g., having one or more antennas, SIM cards, etc.) configured to connect to and communicate over a cellular communications network 110 through a cellular coupling 112. As would be understood, cellular coupling 112 may be a Code Division Multiple Access (CDMA) connection, a Global System for Mobile communications (GSM) connection, or another type of wireless cellular coupling 112. In exemplary embodiments, the cellular coupling 112 embodies any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Moreover, as further illustrated, through cellular communications network 110, each dongle 104 may connect to and communicate over secondary network 108.

Secondary network 108 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over secondary network 108 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, the one or more remote servers 106 (e.g., web servers) are in operable communication with each dongle 104. The remote server(s) 106 can be used to host a service platform or cloud-based application. Additionally or alternatively, remote server(s) 106 can be used to host an information database (e.g., of software installation files, ACMs, recorded log data, or other relevant service data). Remote server(s) 106 can be implemented using any suitable computing device(s). Each remote server 106 generally includes a remote controller 164 having one or more processors 166 and one or more memory devices 168 (i.e., memory). The one or more processors 166 can be any suitable processing device (e.g., a processor core, a microprocessor, an ASIC, a FPGA, a microcontroller, etc.) and can be one processor or a plurality of processors that are operatively connected. The memory device 168 can include one or more non-transitory computer-readable storage mediums, such as RAM, ROM, EEPROM, EPROM, flash memory devices, magnetic disks, etc., and combinations thereof. The memory devices 168 can store data 168B and instructions 168A which are executed by the processors 166 to cause remote server 106 to perform operations. For example, instructions 168A could be instructions 168A for receiving/transmitting transmitting/receiving software installation files, ACMs, log data, etc.

The memory devices 168 may also include data 168B, such as ACMs, log data, etc., that can be retrieved, manipulated, created, or stored by processors 166. The data 168B can be stored in one or more databases. The one or more databases can be connected to remote server 106 by a high bandwidth LAN or WAN, or can also be connected to remote server 106 through secondary network 108. Optionally, the one or more databases can be split up so that they are located in multiple locales.

Remote server 106 includes a network interface 176 such that interactive remote server 106 can connect to and communicate over one or more networks (e.g., cellular communications network 110 or secondary network 108) with one or more network nodes. Network interface 176 can be an onboard component or it can be a separate, off board component. In turn, remote server 106 can exchange data with one or more nodes over the secondary network 108. In particular, remote server 106 can exchange data with dongle 104 (e.g., via cellular communications network 110 and network cellular couplings 112). Moreover, through the corresponding dongles 104, remote server 106 can exchange data with consumer appliances 102. Thus, for certain service operations, dongle 104 may act as a bridge or intermediary for transferring data between remote server 106 and the corresponding consumer appliance 102 (i.e., consumer appliance 102 to which a particular dongle 104 is attached). In some embodiments, when multiple dongles 104 are attached to discrete corresponding consumer appliances 102, remote server(s) 106 may communicate with each consumer appliance 102 simultaneously.

Although not pictured, it is understood that remote server 106 may further exchange data with any number of client devices over the secondary network 108. The client devices can be any suitable type of computing device, such as a general purpose computer, special purpose computer, laptop, desktop, integrated circuit, mobile device, smartphone, tablet, or another suitable computing device. Information or signals (e.g., relating to software installation files, ACMs, log data, etc.) may thus be exchanged between dongle 104 and various separate client devices through remote server 106.

Figure 4:
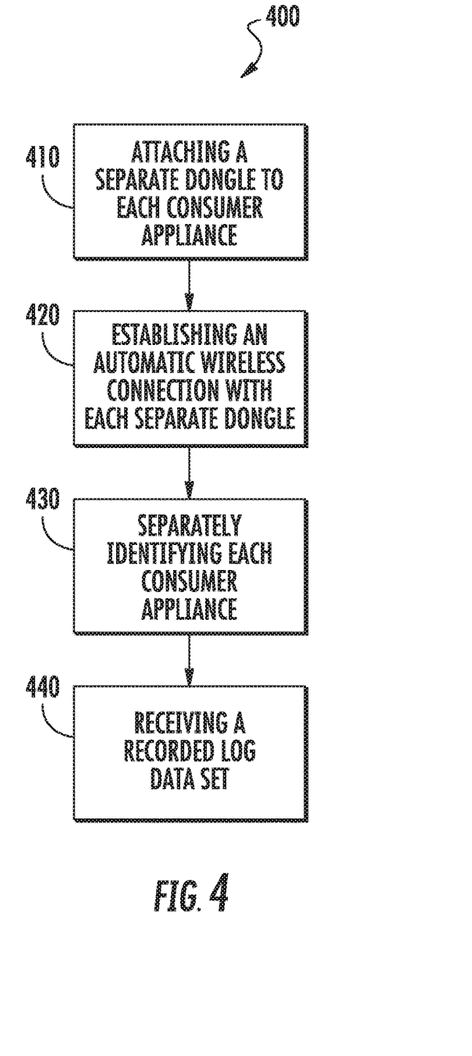
FIG. 4 provides a flow chart illustrating a method of servicing a consumer appliance according to other exemplary embodiments of the present disclosure.

Referring now to FIGS. 3 and 4, various methods (e.g., method 300 and method 400) may be provided for use with system 100 in accordance with the present disclosure. In some embodiments, such as the exemplary embodiments illustrated by methods 300 and 400, all or some of the various steps of the method may be performed by the remote controller(s) 164 as part of an operation that the remote controller(s) 164 are configured to initiate (e.g., a service operation). During such methods, remote controller(s) 164 may receive inputs and transmit outputs from various other portions of the system 100. For example, remote controller(s) 164 may send signals to and receive signals from dongle(s) 104, consumer appliance 102, as well as other suitable components. The present methods may advantageously permit the remote service of at least one consumer appliance or a plurality of consumer appliances simultaneously. Moreover, such methods may advantageously be performed independently of any action or direction from a user or service professional. For example, after a user or service professional has attached a dongle 104 to a corresponding consumer appliance 102, no further input is required from the user or service professional. Furthermore, such methods may advantageously permit the improved and reduced transfer of data (e.g., between consumer appliances 102 and remote servers 106).

FIGS. 3 and 4 depict steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure.

Turning particularly to FIG. 3, at 310, the method 300 includes establishing an automatic wireless connection to a consumer appliance with a removably attached dongle through a cellular communications network. For instance, after the dongle is attached to the consumer appliance (e.g., through an RJ45 port), the dongle may immediately activate the network interface (e.g., cellular radio) of the dongle and establish a cellular communications coupling with the cellular communications network. Through the cellular communications network, the dongle may connect to the secondary network as it requests a connection to the remote servers. Once the dongle connects to the cellular communications network and the secondary network, the controller of the remote server may accept the connection request of the dongle, thereby establishing the wireless connection.

In some embodiments, the attachment between the dongle and the consumer appliance is performed by an end user or service professional. For instance, the end user may be physically shipped the dongle. Thus, the method 300 may include physically shipping the dongle to the user (e.g., to the physical address at which the consumer appliance is located). After receiving the dongle, the user (or a service professional dispatched to the user's address) may insert the dongle (or conductive transmission line connected thereto) into the consumer appliance. As noted above, a connection with the remote server(s) may be automatically established in reaction to the physical attachment of the dongle to the consumer appliance. Advantageously, no further user input or effort may be required, reducing service times and effort required by a service professional. If multiple consumer appliances are located at the same address, multiple dongles may be shipped together and connected to the separate consumer appliances, advantageously permitting multiple consumer appliances to be serviced simultaneously.

At 320, the method 300 includes identifying the consumer appliance as one appliance type of a predetermined plurality of appliance types. As an example, the connected consumer appliance may be identified as a refrigerator appliance, oven appliance, water heater appliance, microwave appliance, washing machine appliance, dryer appliance, or dishwashing appliance.

In some embodiments, 320 includes receiving non-functional character data from a control board of the consumer appliance. In particular, the non-functional character data may be received by the remote servers through the dongle from one or more control boards of the corresponding consumer appliance. The transmission of data from the consumer appliance may be prompted by one or more interrogation requests from the remote servers or, alternatively, prompted automatically with attachment of the dongle to the consumer appliance. As described above, the non-functional character data may include component identification information. Additionally or alternatively, the non-functional character data may include a control board address, a hardware identifier of a control board, an image identifier relating to software preprogrammed on a control board, software version information, parametric file version information, or personality configuration information. In certain embodiments, a plurality of non-functional data elements is collected. Thus, the remote servers may direct the consumer appliance to transmit multiple unique non-functional data elements, such as several or all elements chosen from of a control board address, a hardware identifier of a control board, an image identifier relating to software preprogrammed on a control board, software version information, parametric version information, or personality configuration information.

In some such embodiments, 320 further includes assigning an appliance configuration manifest (ACM) to the consumer appliance based on (e.g., as a direct function of) the received non-functional character data. Between discrete consumer appliance models, differences in the appliances may alter the ACM that is assigned. Assigning an ACM may thus provide a suitable identifier for the consumer appliance that is not programmed or stored on the appliance controller. For instance, an ACM code may be organized as a string or sequence of characters (e.g., numbers). Optionally, each position on the sequence of characters may correspond to a different non-functional character element. As an example, the first position or entry of a sequence of characters for an ACM may be reserved for a value related to the board address.

The value of a character at a specific sequence position may be tied to the non-functional character element. Thus, differences between each non-functional character element may correspond to a different value at the specific sequence position. One board address may cause one value at the specific sequence position while another board address may cause another value at the specific sequence position. As a result, different board addresses may result in different character values for a specific sequence position.

In some embodiments, the assigned ACM is matched to an ACM (e.g., stored ACM) from a plurality of predetermined ACMs. As a result, the ACM at 320 may be one of a plurality of predetermined appliance configuration manifests, which may identify the consumer appliance (e.g., type of consumer appliance, series of consumer appliance, specific model of consumer appliance, etc.). Optionally, the plurality of ACMs may be stored within the memory of the dongle or may be received from the memory of the remote server(s). If the ACM is a new ACM and cannot be matched to one of the plurality of ACMs, an alert signal may be generated (e.g., at the remote server). In response to the alert signal, a remote service professional may assemble a new ACM that can be subsequently transferred from the remote server.

In some embodiments, 320 further includes calculating an identification key from the assigned ACM. For instance, the identification key may represent a new character string or sequence that reduces or compresses the size of the character sequence of the ACM. Optionally, the calculation may be made according to a cyclic redundancy check algorithm, a cryptographic hash function, or another suitable operation.

At 330, the method 300 includes receiving a recorded log data set from the consumer appliance through the dongle based on the identified appliance type. As noted above, the recorded log data set may include, for instance, fault codes, cycle history, or other relevant information pertaining to operation of the consumer appliance. Different consumer appliances (e.g., different models of a specific consumer appliance, different types of consumer appliances, etc.) may record different data or information during operation. Thus, it may be advantageous for the remote servers to only attempt the collection of relevant information (e.g., class of information, such as temperature history, activation/deactivation history, one or more fault codes, etc.). Some discrete consumer appliance may cause a different discrete log data set to be collected. Other consumer appliances may cause the same log data set to be collected. As an example, some refrigerator appliances (e.g., models) may prompt the collection of a certain log data set (e.g., temperature history), while other refrigerator appliances (e.g., models) may prompt the collection of the same log data set. As another example, some refrigerator appliances (e.g., models) may prompt the collection of a certain log data set (e.g., temperature history), while other refrigerator appliances (e.g., models) may prompt the collection of another log data set (e.g., activation/deactivation history for a compressor of the refrigerator appliance).

At 340, the method 300 includes determining whether an errant event has occurred at the consumer appliance based on the recorded log data set. For example, one or more fault codes within the recorded log data set may indicate a specific unintended or undesirable performance action occurred within the consumer appliance. Additionally or alternatively, certain patterns within the log data set may indicate certain similarly unintended or undesirable performance actions. The remote servers may detect such fault codes or patterns and thereby determine an errant event. Such patterns may be detected instantly upon receiving a recorded log data set, or may be identified over time (e.g., after the receipt of multiple recorded log data sets transmitted at discrete times from the dongle to the remote servers). In response to determining an errant has occurred, the remote servers may transmit an error signal (e.g., to the consumer appliance or a nearby service professional), thereby providing rapid remote feedback regarding the consumer appliance.

In some embodiments, the method 300 includes determining a current software version on the consumer appliance (i.e., the version of the software installed and operating on the controller of the consumer appliance). For instance, through the removably attached dongle, the remote servers may transmit one or more interrogation signals from which the current software version on the control board(s) of the consumer appliance can be determined. Optionally, the software version may be included with the ACM. Once the current software is determined, the current software version may be compared to the intended software version (i.e., most recently updated version of software for that particular consumer appliance). If the current software version matches the intended software version, the remote server may permit continued, uninterrupted operation of the consumer appliance. If the current software version does not match the intended software version, the remote server may direct installation of a new software file including the intended software version. For instance, multiple software images that are included within the software file may be installed across one or more control boards of the controller of the consumer appliance. Optionally, the new software file may be stored within the dongle (e.g., preprogrammed within the memory of the dongle). As an example, the new software file may be selected from a plurality of software files stored on the dongle (e.g., within the memory of the isolate controller). Additionally or alternatively, the new software file may be transmitted to the dongle from the remote server (e.g., through the secondary network and cellular communications network).

Turning particularly to FIG. 4, at 410, the method 400 includes attaching a separate dongle of a plurality of dongles to each consumer appliance of a plurality of consumer appliances. As discussed above, the attachment between each dongle and consumer appliance may be performed by an end user or service professional. For instance, the end user may be physically shipped the plurality of dongles. After receiving the dongle, the user (or a service professional dispatched to the user's address) may insert the dongles (or conductive transmission lines connected thereto) into separate corresponding consumer appliances.

As noted above, in some embodiments, a connection with the remote server(s) is automatically established in reaction to the physical attachment of each dongle to the corresponding consumer appliance. Advantageously, no further user input or effort may be required, reducing service times and effort required by a service professional, and multiple consumer appliances may be serviced simultaneously.

At 420, the method 400 includes identifying the consumer appliance as one appliance type of a predetermined plurality of appliance types. As an example, the connected consumer appliance may be identified as a refrigerator appliance, oven appliance, water heater appliance, microwave appliance, washing machine appliance, dryer appliance, or dishwashing appliance.

In some embodiments, 420 includes receiving non-functional character data from a control board of the consumer appliance. In particular, the non-functional character data may be received by the remote servers through the dongle from one or more control boards of the consumer appliance. The transmission of data from the consumer appliance may be prompted by one or more interrogation requests from the remote servers or, alternatively, prompted automatically with attachment of the dongle to the consumer appliance. As described above, the non-functional character data may include component identification information. Additionally or alternatively, the non-functional character data may include a control board address, a hardware identifier of a control board, an image identifier relating to software preprogrammed on a control board, software version information, parametric version information, or personality configuration information. In certain embodiments, a plurality of non-functional data elements is collected. Thus, the remote servers may direct the consumer appliance to transmit multiple unique non-functional data elements, such as several or all elements chosen from of a control board address, a hardware identifier of a control board, an image identifier relating to software preprogrammed on a control board, software version information, parametric version information, or personality configuration information.

In some such embodiments, 420 further includes assigning an appliance configuration manifest (ACM) to the consumer appliance based on (e.g., as a direct function of) the received non-functional character data. Between discrete consumer appliance models, differences in the appliances may alter the ACM that is assigned. Assigning an ACM may thus provide a suitable identifier for the consumer appliance that is not programmed or stored on the appliance controller. For instance, an ACM code may be organized as a string or sequence of characters (e.g., numbers). Optionally, each position on the sequence of characters may correspond to a different non-functional character element. As an example, the first position or entry of a sequence of characters for an ACM may be reserved for a value related to the board address.

The value of a character at a specific sequence position may be tied to the non-functional character element. Thus, differences between each non-functional character element may correspond to a different value at the specific sequence position. One board address may cause one value at the specific sequence position while another board address may cause another value at the specific sequence position. As a result, different board addresses may result in different character values for a specific sequence position.

In some embodiments, the assigned ACM is matched to an ACM (e.g., stored ACM) from a plurality of predetermined ACMs. As a result, the ACM at 420 may be one of a plurality of predetermined appliance configuration manifests, which may identify the consumer appliance (e.g., type of consumer appliance, series of consumer appliance, specific model of consumer appliance, etc.). Optionally, the plurality of ACMs may be stored within the memory of the dongle or may be received from the memory of the remote server(s). If the ACM is a new ACM and cannot be matched to one of the plurality of ACMs, an alert signal may be generated (e.g., at the remote server). In response to the alert signal, a remote service professional may assemble a new ACM that can be subsequently transferred from the remote server.

In some embodiments, 420 further includes calculating an identification key from the assigned ACM. For instance, the identification key may represent a new character string or sequence that reduces or compresses the size of the character sequence of the ACM. Optionally, the calculation may be made according to a cyclic redundancy check algorithm, a cryptographic hash function, or another suitable operation.

At 420, the method 400 includes receiving a recorded log data set from the consumer appliance through the dongle based on the identified appliance type. As noted above, the recorded log data set may include, for instance, fault codes, cycle history, or other relevant information pertaining to operation of the consumer appliance. Different consumer appliances (e.g., different models of a specific consumer appliance, different types of consumer appliances, etc.) may record different data or information during operation. Thus, it may be advantageous for the remote servers to only attempt the collection of relevant information (e.g., class of information, such as temperature history, activation/deactivation history, one or more fault codes, etc.). Some discrete consumer appliance may cause a different discrete log data set to be collected. Other consumer appliances may cause the same log data set to be collected. As an example, some refrigerator appliances (e.g., models) may prompt the collection of a certain log data set (e.g., temperature history), while other refrigerator appliances (e.g., models) may prompt the collection of the same log data set. As another example, some refrigerator appliances (e.g., models) may prompt the collection of a certain log data set (e.g., temperature history), while other refrigerator appliances (e.g., models) may prompt the collection of another log data set (e.g., activation/deactivation history for a compressor of the refrigerator appliance).

As noted above, once the recorded log data set is received, various service actions may be further taken, such as identification of an errant event or directing installation of a new software file to one or more of the connected consumer appliances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of servicing a consumer appliance, the method comprising:
    establishing an automatic wireless connection to the consumer appliance with a removably attached dangle through a cellular communications network;
    identifying the consumer appliance as one appliance type of a predetermined plurality of appliance types;
    receiving a recorded log data set from the consumer appliance through the dongle based on the identified appliance type; and
    determining whether an errant event has occurred at the consumer appliance based on the recorded log data set,
    wherein identifying the consumer appliance comprises
        receiving non-functional character data from a control board of the consumer appliance,
        assigning an appliance configuration manifest to the consumer appliance based on the collected non-functional data, and selecting the one appliance type based on the assigned appliance configuration manifest.

2. The method of claim 1, wherein the method further comprises transmitting an error signal in response to determining an errant event has occurred.

3. The method of claim 1, wherein the consumer appliance is a refrigerator appliance, oven appliance, water heater appliance, microwave appliance, washing machine appliance, dryer appliance, or dishwashing appliance.

4. The method of claim 1, wherein the dongle is attached to the consumer appliance through an RJ45 terminal on the consumer appliance.

5. The method of claim 1, further comprising physically shipping the removably attached dongle to a user before establishing the automatic wireless connection.

6. The method of claim 1, further comprising determining a current software version on the consumer appliance.

7. The method of claim 6, further comprising directing installation of a new software file if it is determined that the current software version is outdated.

8. The method of claim 7, wherein the new software file is selected from a plurality of software files stored on the dongle.

9. The method of claim 7, wherein the new software file is transmitted to the dongle from the remote server.

10. A method of servicing a plurality of consumer appliances, the method comprising:
    attaching a separate dongle of a plurality of dongles to each consumer appliance of the plurality of consumer appliances;
    establishing an automatic wireless connection with each separate dongle of the plurality of dongles through a cellular communications network;
    separately identifying each consumer appliance as one appliance type of a predetermined plurality of appliance types; and
    receiving a recorded log data set from each consumer appliance through the attached dongle based on the separately identified appliance type,
    wherein separately identifying each consumer appliance as one appliance type of a predetermined plurality of appliance types comprises
        receiving non-functional character data from a control board of each consumer appliance,
        assigning an appliance configuration manifest to each consumer appliance based on the collected non-functional data, and
        selecting the one appliance type based on the assigned appliance configuration manifest.

11. The method of claim 10, wherein the method further comprises transmitting an error signal from one dongle of the plurality of dongles in response to determining an errant event has occurred at a corresponding consumer appliance of the plurality of consumer appliances.

12. The method of claim 10, wherein each consumer appliance is a refrigerator appliance, oven appliance, water heater appliance, washing machine appliance, dryer appliance, or dishwashing appliance.

13. The method of claim 10, wherein each dongle of the plurality of dangles is attached to a corresponding consumer appliance of the plurality of consumer appliances through an RJ45 terminal on the corresponding consumer appliance.

14. The method of claim 10, further comprising physically shipping the plurality of dangles to a user before establishing the automatic wireless connection.

15. The method of claim 10, further comprising determining a current software version on at least one consumer appliance of the plurality of consumer appliances.

16. The method of claim 15, further comprising directing installation of a new software file if it is determined that the current software version is outdated.

17. The method of claim 16, wherein the new software file is selected from a plurality of software files stored on the dongle.

18. The method of claim 16, wherein the new software file is transmitted to the dongle from the remote server.

* * * * *